United States Patent
Kralles et al.

(10) Patent No.: US 7,148,501 B1
(45) Date of Patent: Dec. 12, 2006

(54) STORAGE PHOSPHOR READER HAVING FRAME VIBRATION ISOLATION AND FRAME LOCKING

(75) Inventors: Christopher J. Kralles, Rochester, NY (US); William C. Wendlandt, Rush, NY (US); Michael Kenin, Rochester, NY (US); David E. Foeller, Batavia, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/320,098

(22) Filed: Dec. 28, 2005

(51) Int. Cl.
*G03B 42/08* (2006.01)
*B65H 5/00* (2006.01)

(52) U.S. Cl. .................. 250/589; 250/584

(58) Field of Classification Search .......... 250/584, 250/586, 589, 590, 588, 581, 580
See application file for complete search history.

(56) References Cited

U.S. PATENT DOCUMENTS

| | | | |
|---|---|---|---|
| 4,417,260 A | 11/1983 | Kawai et al. | |
| 4,833,325 A | 5/1989 | Torii et al. | |
| 5,440,146 A | 8/1995 | Steffen et al. | |
| 5,493,128 A * | 2/1996 | Boutet | 250/584 |
| 6,739,768 B1 | 5/2004 | Johnke et al. | |
| 2002/0060303 A1* | 5/2002 | Yonekawa | 250/589 |
| 2004/0089826 A1* | 5/2004 | Yonekawa | 250/584 |

* cited by examiner

*Primary Examiner*—David Porta
*Assistant Examiner*—Mark R. Gaworecki
(74) *Attorney, Agent, or Firm*—Susan L. Parulski

(57) ABSTRACT

A storage phosphor reader apparatus for reading exposed storage phosphors. The reader includes an outer frame assembly including a cassette handling assembly for handling cassettes; an inner frame assembly; a first set of vibration isolators; a storage phosphor scanning assembly; and a second set of vibration isolators. A frame locker assembly is provided for locking the scanning assembly to the outer frame assembly when a cassette is transferred between the cassette handling assembly and the scanning assembly and for unlocking the scanning assembly during scanning of a storage phosphor removed from the cassette, so that the first and second sets of vibration isolators isolate the scanning assembly during storage phosphor scanning.

8 Claims, 20 Drawing Sheets

STORAGE PHOSPHOR READER HAVING FRAME VIBRATION ISOLATION AND FRAME LOCKING

FIELD OF THE INVENTION

This invention relates in general to computed radiography imaging systems and more particularly to a computed radiography storage phosphor reader having improved vibration isolation

BACKGROUND OF THE INVENTION

Computed Radiography (CR) is a well established method of radiographic imaging used in the health care environment. The CR system involves exposing a storage phosphor contained in a cassette to x-radiation of a body part of a person to produce a latent radiographic image in the storage phosphor. The cassette is presented to a storage phosphor reader where the storage phosphor is extracted from the cassette, scanned (read) with a stimulating radiation beam to produce a stimulated radiation image which is converted to an electronic (digital) image which can be stored, displayed, transmitted, or output on film. After the latent image has been scanned, the storage phosphor is erased to remove noise and any residual image, and the storage phosphor is replaced in the cassette ready for reuse.

The scanning system typically uses a laser to energize the storage phosphor. Light energy is released from the storage phosphor and collected using multifaceted, mirrored surfaces, which direct the light energy into photodetectors that amplify the signal. The scanning operation is very sensitive to vibration and impacts, which cause relative movement between the laser and storage phosphor, between the storage phosphor and the light collector, and vibrations around the constant velocity drive system, which moves the storage phosphor past the scanning laser. Such vibrations can result in undesirable image degradation which can affect the diagnostic quality of the radiographic image. In a known storage phosphor reader, vibration isolation is accomplished by separating the scanning assembly from the outer frame and from an upper cassette handling assembly by supporting the scanning assembly separately on the floor.

U.S. Pat. No. 4,833,325, issued May 23, 1989, inventors Torii et al., discloses an image readout apparatus in which stimulable phosphor sheets are transported along a horizontal path through an image readout system. Vibro-isolating light shield members are interposed between the image readout mechanism and a casing, which are individually supported on a floor. Vibro-isolating members are also disposed between a conveyor system for delivering a stimulable phosphor sheet and an optical system for applying the stimulating light to the stimulable phosphor sheet.

U.S. Pat. No. 4,417,260, issued Nov. 22, 1983, inventors Kawai i.e. al., discloses an image scanning system in which the optical components for scanning a stimulating light beam across a recording medium and the mechanical components for moving the recording medium through the system in a horizontal direction are all mounted on a single frame which in turn is mounted by way of a vibrating insulator on an outer frame structure.

U.S. Pat. No. 5,440,146, issued Aug. 8, 1995, inventors Steffen et al., discloses a radiographic image reader wherein a photoreceptive medium is transported horizontally through the reader and an optics module is supported on a support stand by kinematic mounts.

U.S. Pat. No. 6,739,768 B2, issued May 25, 2004, inventors Johnke et al., discloses an apparatus for processing photographic material horizontally transported through the apparatus. A housing and a processing station are each independently mounted through their own oscillation-damping connection to a common support base.

None of these patents address the problem of vibration isolation in apparatus in which a storage phosphor is vertically transported through a scanning and erase process or the problem of locking the scanning assembly to a cassette handling assembly during transfer of a cassette between such assemblies.

SUMMARY OF THE INVENTION

According to the present invention, there is provided an apparatus directed to overcoming the problems.

According to one aspect of the present invention there is provided storage phosphor reader apparatus comprising: an outer frame assembly including a cassette handling assembly, located on the upper part of said outer frame assembly, for handling vertically oriented cassettes; an inner frame assembly; a first set of vibration isolators for mounting said inner frame assembly on said outer frame assembly, so as to minimize vibrations caused in said outer frame assembly from being transmitted to said inner frame assembly; a storage phosphor scanning assembly; and a second set of vibration isolators for mounting said scanning assembly on said inner frame assembly, so as to minimize vibrations caused in said inner frame assembly frame from being transmitted to said scanning assembly; and a frame locker assembly for locking said scanning assembly to said outer frame assembly when a cassette is transferred between said cassette handling assembly and said scanning assembly and for unlocking said scanning assembly during scanning of a storage phosphor removed from said cassette, so that said first and second sets of vibration isolators isolate said scanning assembly during storage phosphor scanning.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
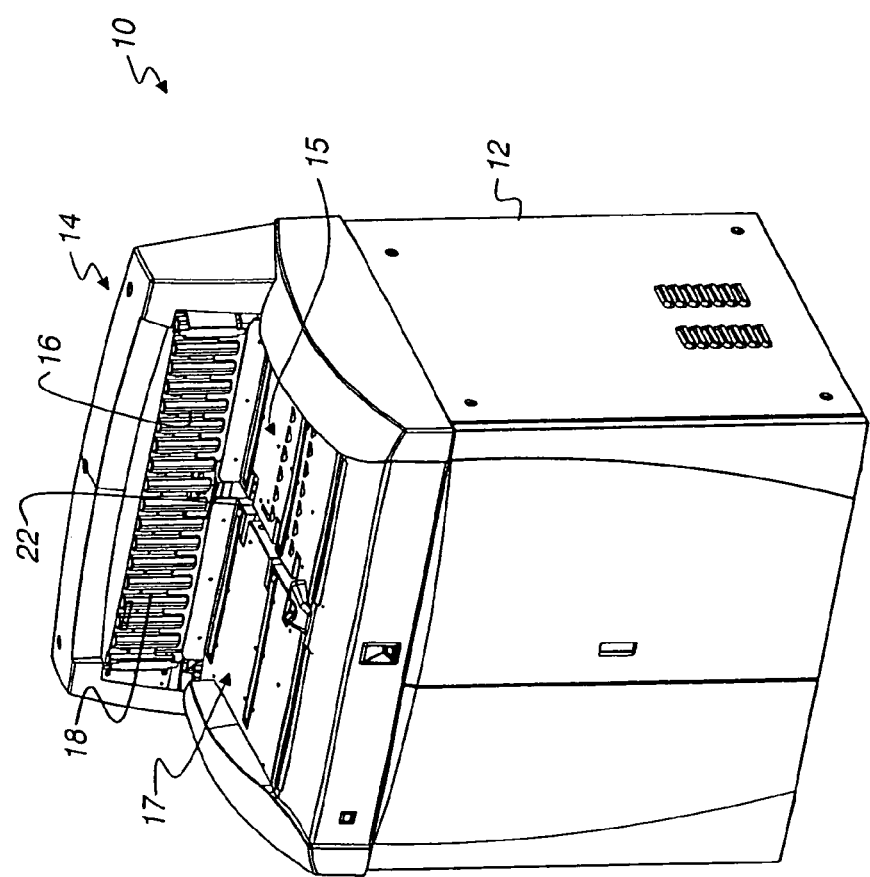
FIG. 1 is a perspective view of a storage phosphor reader incorporating the present invention.
Figure 2:
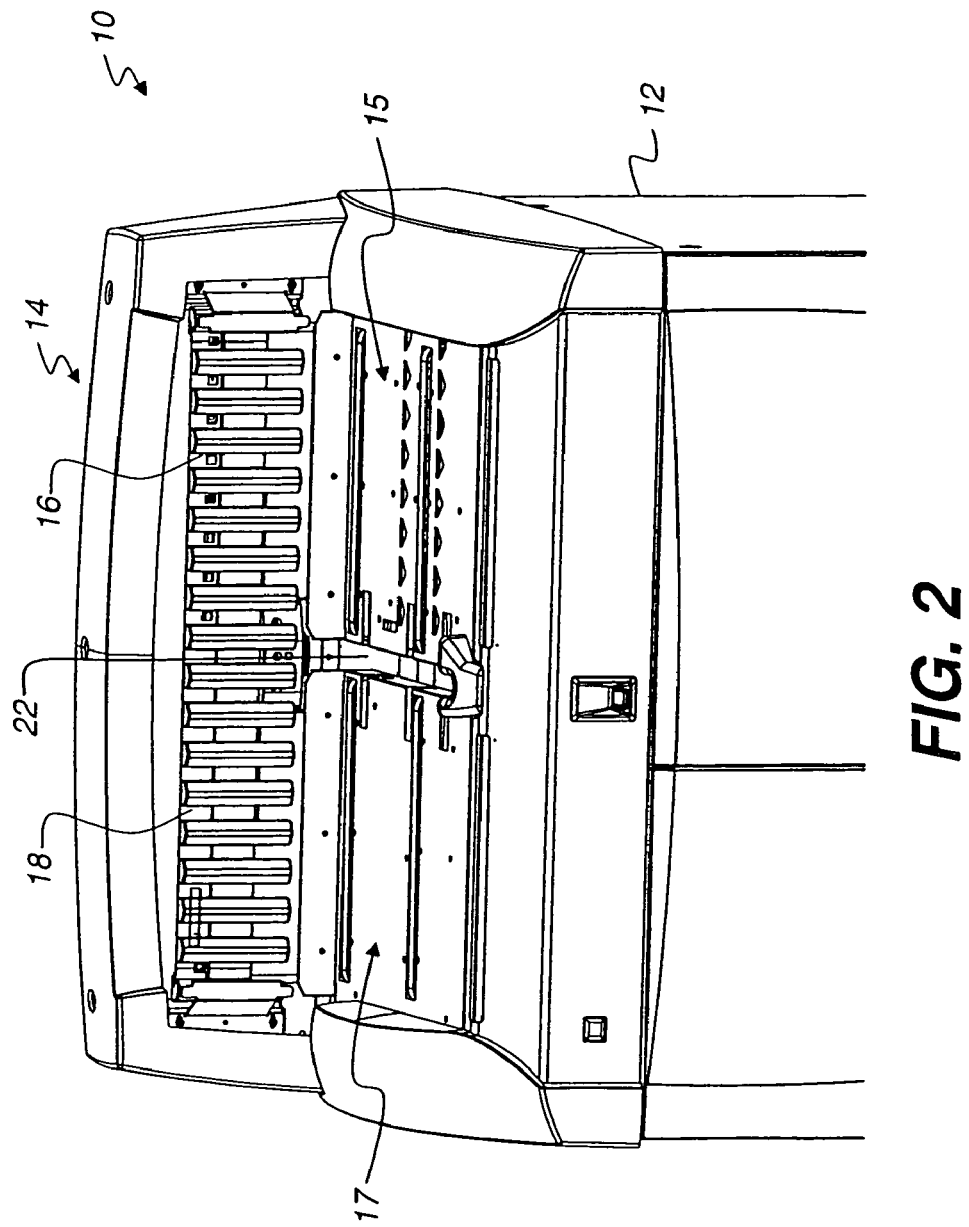
FIG. 2 is an exploded perspective view of the reader of FIG. 1 showing no cassettes mounted on the cassette handling assembly.
Figure 3:
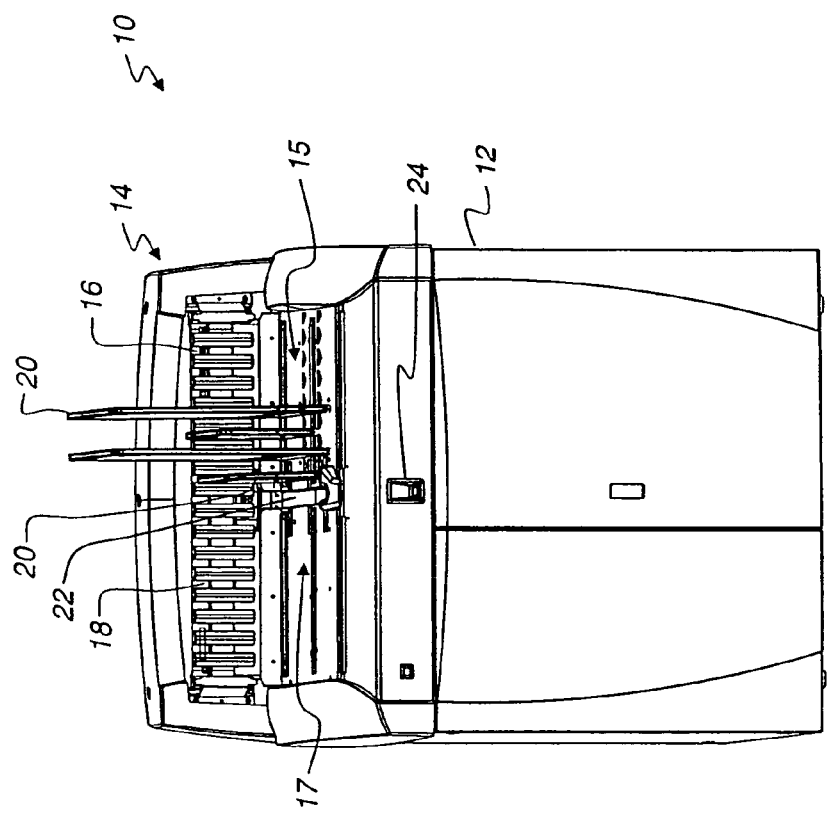
FIGS. 3 and 4 are perspective and exploded perspective views of the reader of FIG. 1 showing cassettes of different sizes loaded onto the cassette handling assembly.
Figure 4:
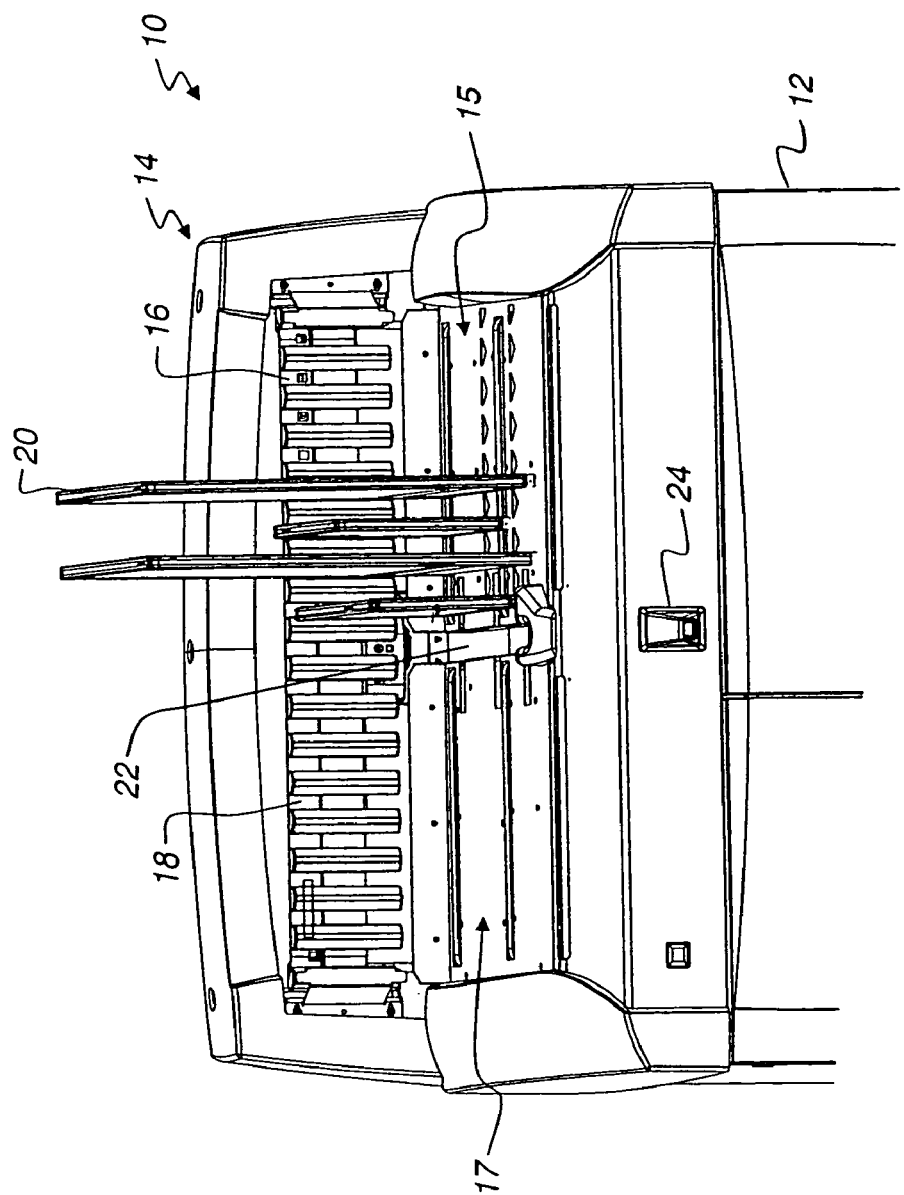

In general, a storage phosphor reader incorporating the present invention is provided with three main frame assemblies, an outer frame assembly, an inner frame assembly, and a scanning assembly. A cassette handling assembly is part of an upper frame assembly supported by the outer frame assembly. The outer frame assembly also supports the inner frame assembly which in turn supports the scanning assembly. Vibration isolation between the scanning assembly and the outer frame assembly is accomplished by using two levels of isolation. One level is between the outer frame assembly and the inner frame assembly and the other level is between the inner frame assembly and the scanning assembly Referring now to the Figures, there is shown an embodiment of the present invention. As shown in FIGS. 1–4, storage phosphor reader 10 includes a housing 12 having a cassette handling assembly 14 on the upper part thereof. Cassette handling assembly 14 includes a load side 15 having several cassette loading locations 16 and an unload side 17 having several cassette unloading locations 18. The cassettes on side 15 contain exposed storage phosphors to be read by reader 10, whereas the cassettes on side 17 contain storage phosphors that have been read and erased and are ready for reuse. FIGS. 3 and 4 show cassettes 20 of different dimensions vertically mounted on the load side 15 of cassette handling assembly 14. Reader 10 is also provided with a central slot 22 at which cassettes 20 are sequentially positioned by assembly 14 for scanning. A start button 24 is provided at the front of reader 10.

Figure 5:
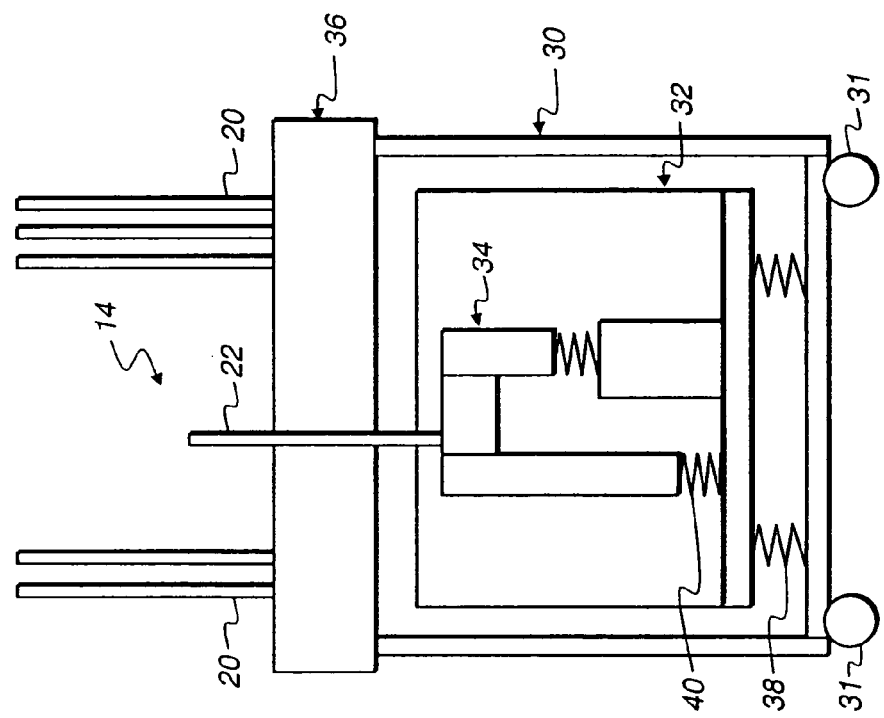
FIG. 5 is a diagrammatic view of an embodiment of the present invention.

FIG. 5 diagrammatically shows an embodiment of the present invention. As shown, reader 10 includes outer frame assembly 30, an inner frame assembly 32, and a scanning assembly 34. The outer frame assembly 30 also supports an upper frame assembly 36 having cassette handling assembly 14. Outer frame assembly 30 is mounted on wheels 31 for ease of movement of reader 10. Inner frame assembly 32 is supported on outer frame assembly 30 by a first set of low frequency vibration isolators 38. Scanning assembly 34 is mounted on inner frame assembly 32 by a second set of higher frequency vibration isolators 40. Scanning assembly 34 includes a laser and associated optics, a reciprocating galvo mirror for scanning the laser beam, and a storage phosphor positioning system including a very smooth motion lead screw drive with feedback controls to position a storage phosphor relative to the scanning laser beam. In an implementation of reader 10, the natural frequency of the scanning assembly 34 mounted on isolators 40 to inner frame assembly 32 is approximately 5 Hz in the axial direction and approximately 21 Hz in the radial direction.

Figure 6:
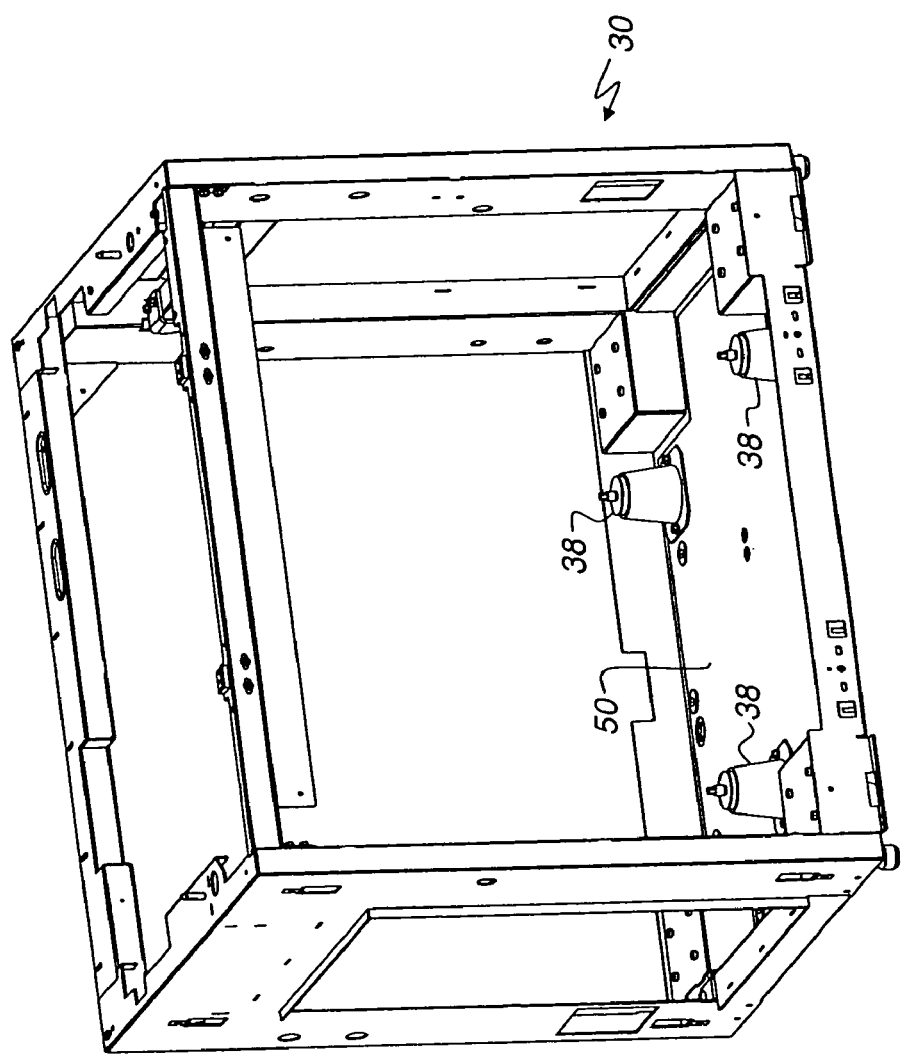
FIG. 6 is a diagrammatic, perspective view of the outer frame assembly of the reader of FIG. 1 showing three low frequency vibration isolators for mounting an inner frame assembly.

FIGS. 6–12 show in greater detail the present invention. FIG. 6 shows outer frame assembly 30 as a generally rectangular structure having three low frequency vibration isolators 38 mounted on a base plate 50 for mounting inner frame assembly 32. Isolators 38 are rubber isolators with internally molded compression springs. Isolators 38 are positioned such that the entire weight of the inner frame assembly 32, including the weight of scanning assembly 34, is equally distributed among them. This equal distribution of weight aids in maintaining an equal amount of creep of each isolator.

Figure 7:
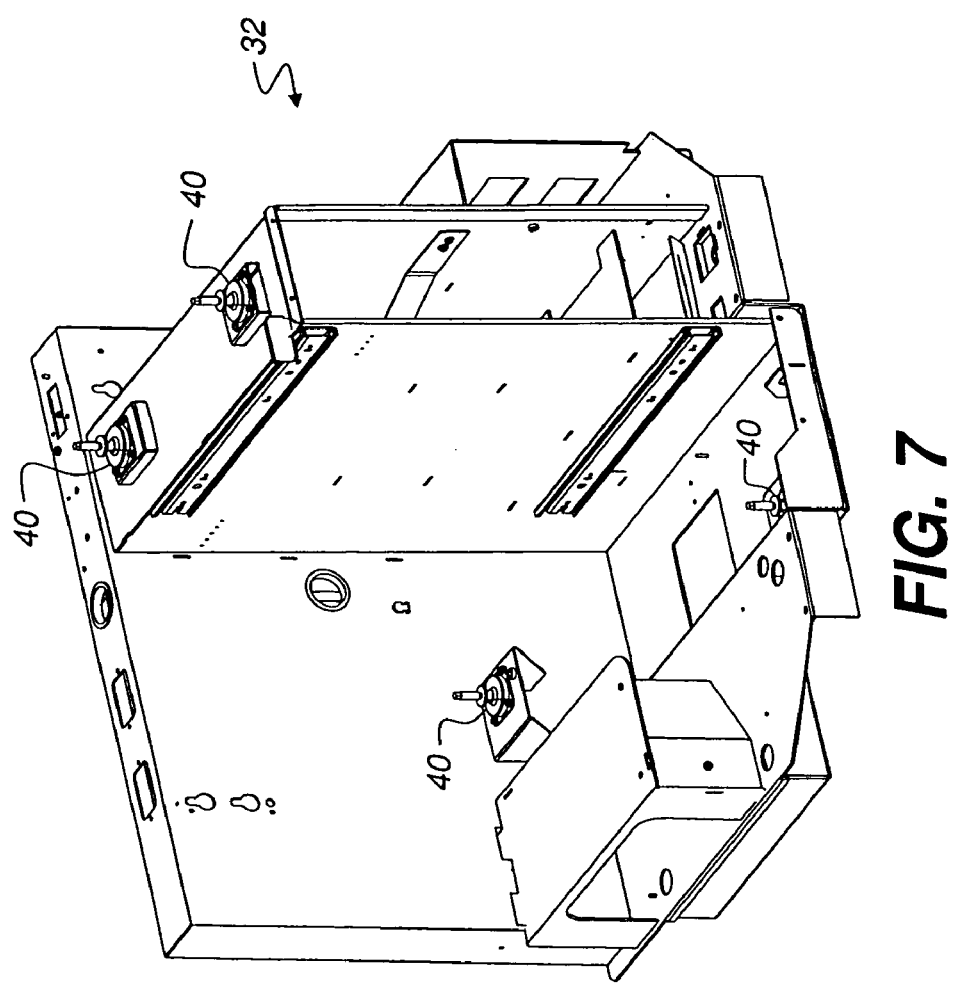
FIG. 7 is a diagrammatic perspective view of the inner frame assembly of the reader of FIG. 1 showing four higher frequency vibration isolators for mounting the scanning assembly.
Figure 11:
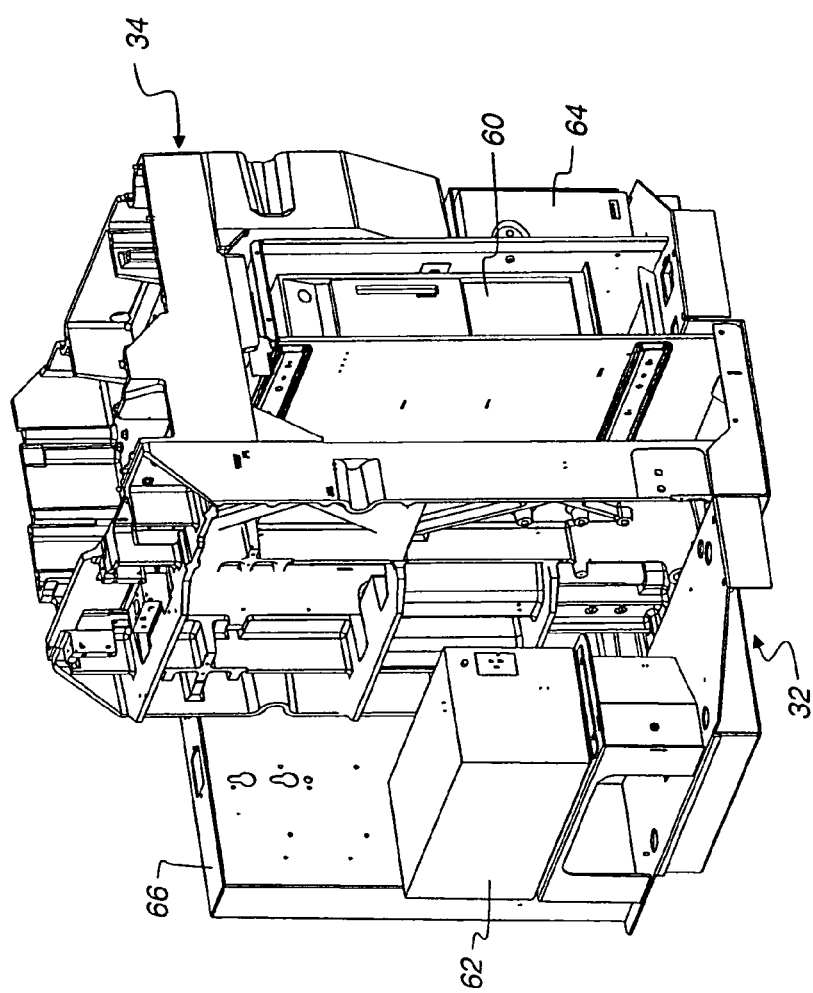
FIG. 11 is a diagrammatic, perspective view of the scanning assembly mounted on the inner frame assembly.

FIG. 7 shows the inner frame assembly 32 with four vibration isolators 40 for mounting scanning assembly 34. FIG. 11 shows inner frame assembly 32 mounting scanning assembly 34, computer 60, world wide power supply 62, UPS battery backup 64, cooling fans, an electrical box 66 containing all the circuit boards. In the implementation of reader 10, the natural frequency of the complete inner frame assembly is approximately 5 Hz in the axial direction and approximately 3 Hz in the radial direction. The low natural frequency of the inner frame assembly 32 isolates the scanning assembly 34 from external impacts against outer frame assembly 30 and cassette handling impacts from the upper frame. These impacts are contained within the outer frame assembly 30 so it can be moved for service very easily without the need to realign the scanning assembly 34 to the cassette handling assembly 14.

Figure 8:
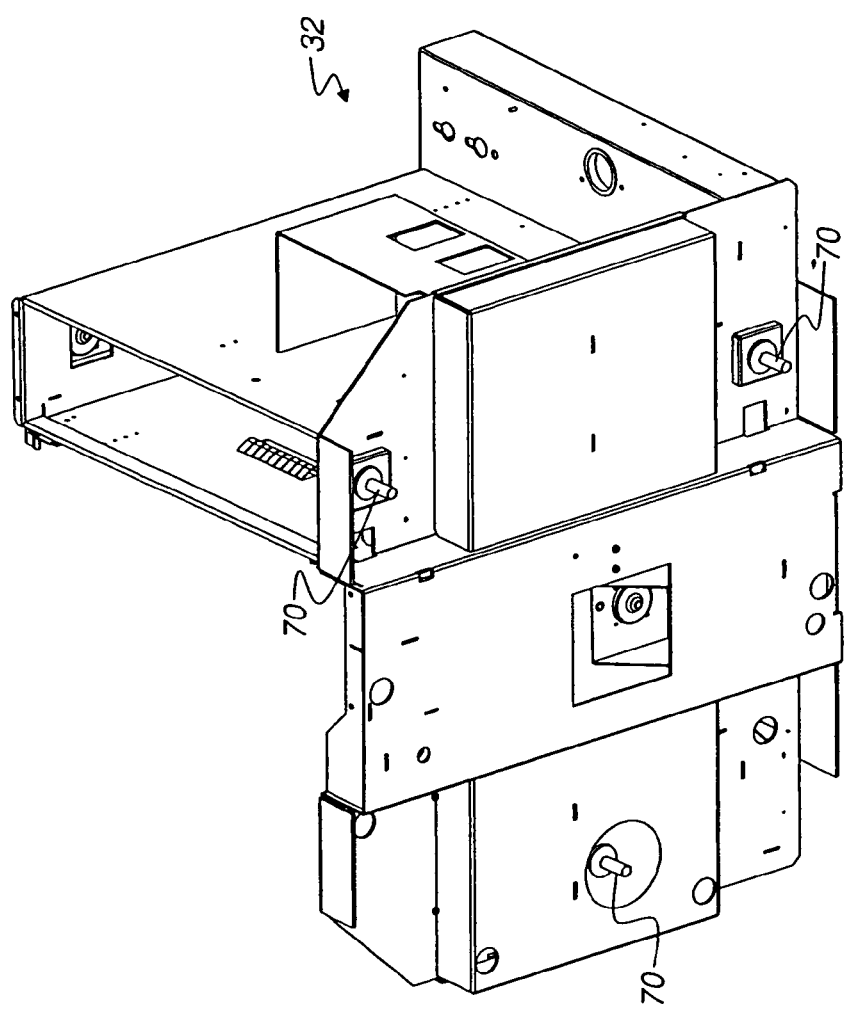
FIG. 8 is a diagrammatic perspective view showing the inner frame assembly tipped back looking under to three isolator jackstuds that support the inner frame assembly.

FIG. 8 shows inner frame assembly 32 tipped back looking under to see three jack studs 70 that support inner frame assembly 32 on outer frame assembly 30 by screwing into isolators 38. Jack studs 70 are used during alignment of reader 10 to "dial out" isolator height, isolator stiffness and frame tolerances.

Figure 9:
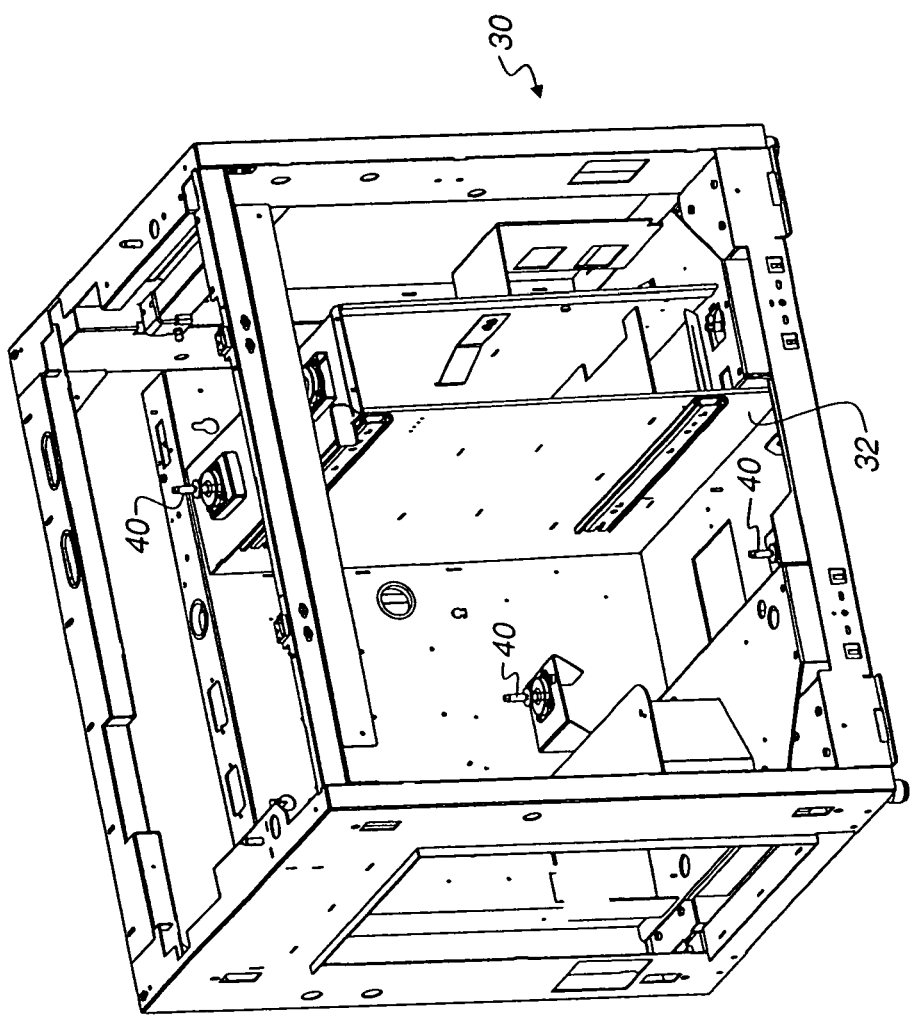
FIG. 9 is a diagrammatic perspective view showing the inner frame assembly mounted on the outer frame assembly.
Figure 10:
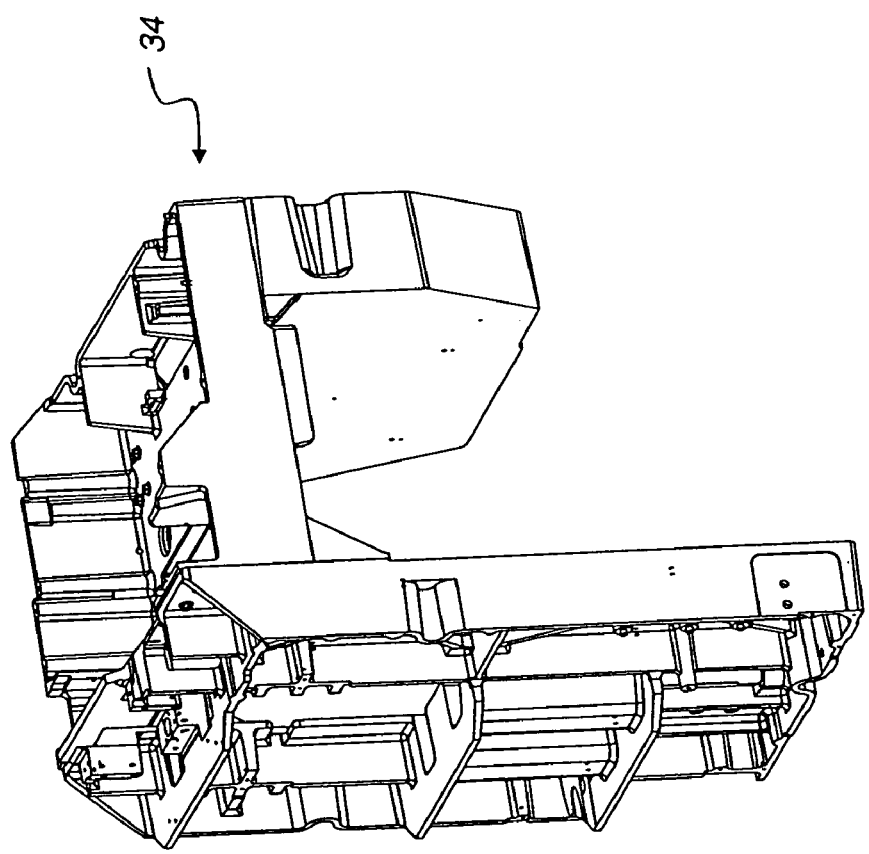
FIG. 10 is a diagrammatic perspective view of the scanning assembly which includes the optical system and scanning system.
Figure 12:
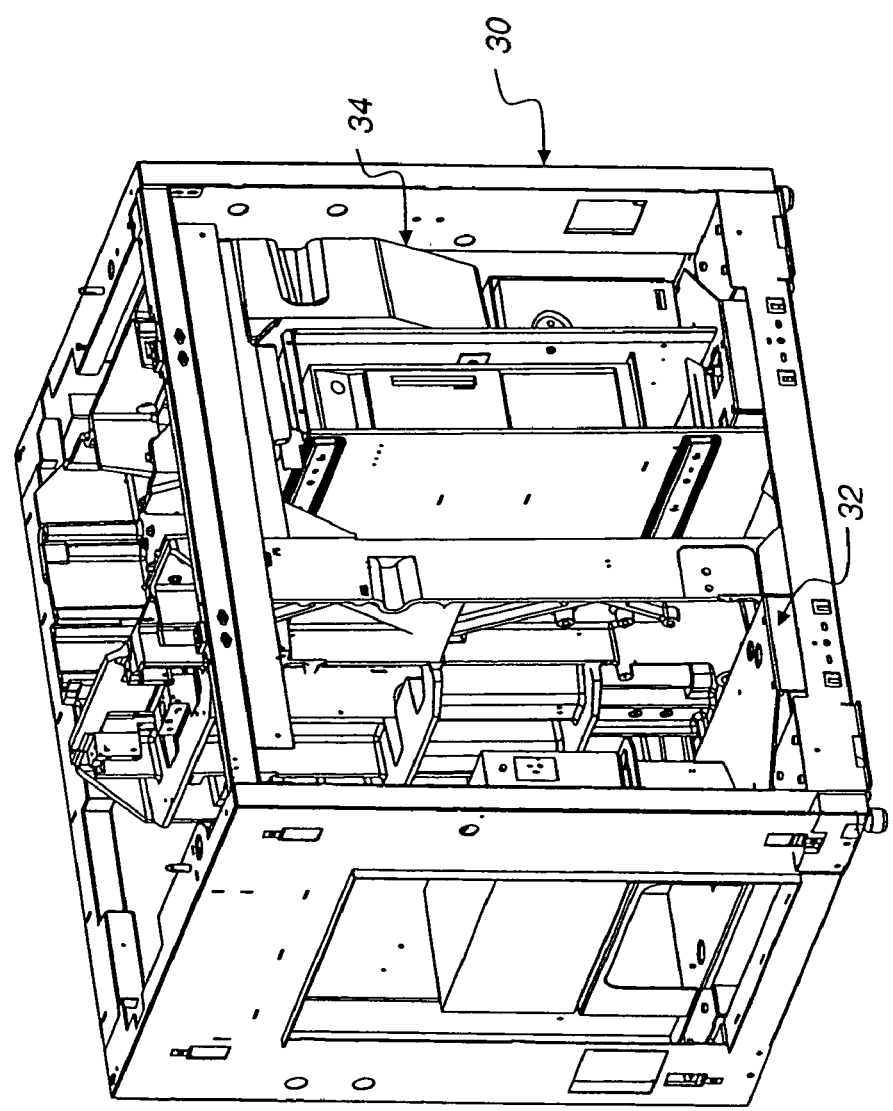
FIG. 12 is a diagrammatic, perspective view of the scanning assembly, inner frame assembly, and outer frame assembly assembled together.

FIG. 9 shows inner frame assembly 32 mounted on outer frame assembly 30 by isolators 38. Isolators 40 are shown for mounting scanning assembly 34. FIG. 10 shows scanning assembly 34 alone and FIG. 11 shows scanning assembly 34 mounted on inner frame assembly 32 by isolators 40. FIG. 12 shows scanning assembly 34, inner frame assembly 32, and outer frame assembly 30 assembled together.

According to the invention, the design intent is to drive the natural frequency of the inner frame assembly 32 as low as possible in order to provide lower transmissibility of external vibration and impacts. To drive the Natural Frequency down required an isolator with a high load capability and low stiffness. In the implementation of reader 10, the weight of the inner frame assembly 32 was increased as much as possible by mounting the world wide power supply, UPS battery backup, erase assembly, computer and electrical box on the inner frame assembly 32. This helped increase the weight of the assembly to 500 pounds. The purpose of the second layer of isolation is to isolate higher frequencies between the inner frame assembly 32 and the scanning assembly 34. These frequencies were on the order of 50 Hz and higher and came from internal components, such as fans and other electrical devices. As shown and described above, two layers of vibration isolation are used to isolate the scanning system from impacts and vibration. The source of these impacts were both external (customer induced) as well as internal (component vibration). Some external impacts include loading cassettes onto the reader during a phosphor scan, dropping a stack of cassettes to be loaded onto the reader work surface, removing cassettes from the unload side during phosphor scan, bumping the front or sides during phosphor scan, and using the reader controls during phosphor scan. The low frequency vibration isolation was designed to provide the necessary isolation from primarily external impacts and the second layer of vibration isolation was used to provide isolation from primarily internally generated sources.

One difficulty with employing vibration isolators in a scanning device is that there is the potential of adding a great deal of positional variation between critical subassemblies. This variation is unpredictable due to varying amounts of isolator creep, machine levelness, and frame twist. A function of the cassette handling assembly 14 is to transfer a cassette from the cassette handling assembly to an elevator which moves the cassette vertically to scanning assembly 34. This system interface requires repeatable cassette positioning in order for transfer to occur reliably.

Figure 13:
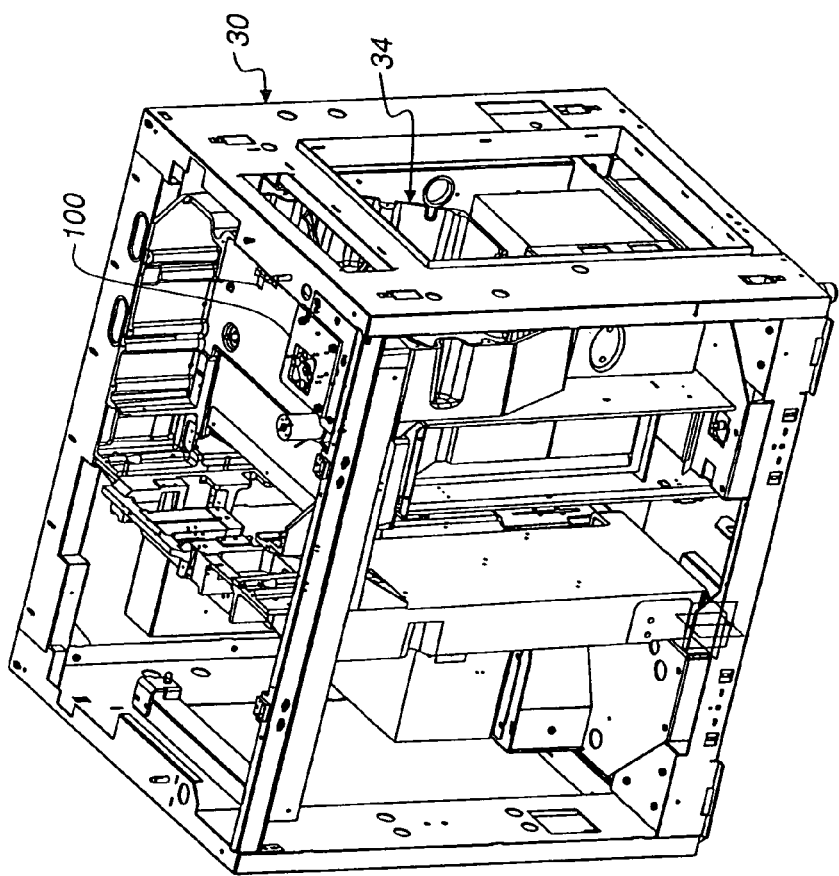
FIGS. 13 and 14 are perspective, diagrammatic views showing the Frame Locker mounted to the outer frame assembly and the scanning assembly.
Figure 14:
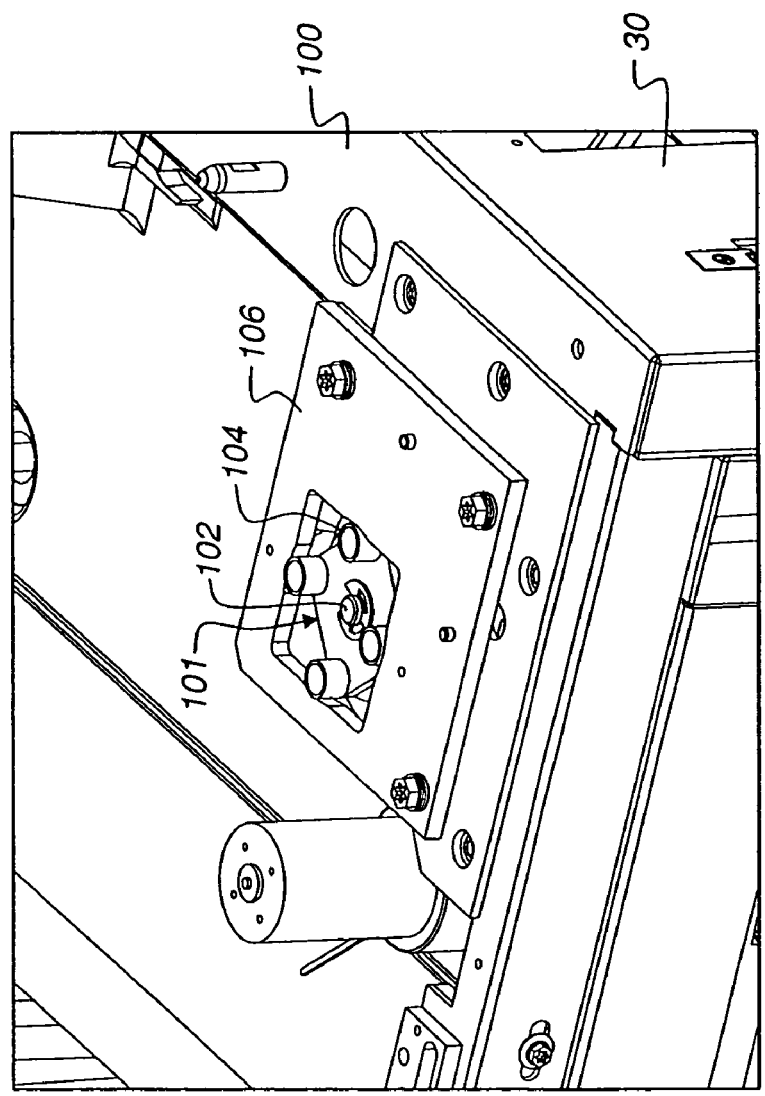
Figure 15:
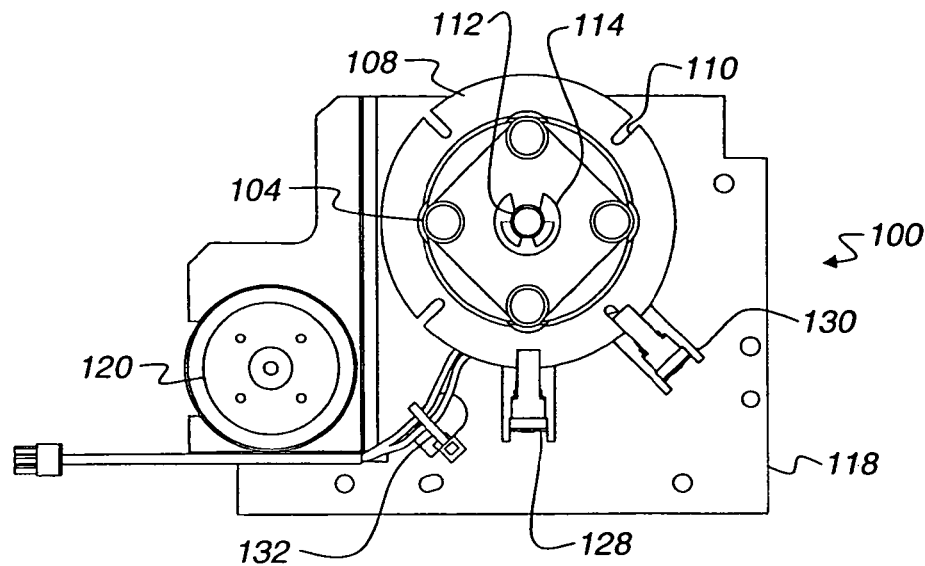
FIGS. 15–19 are diagrammatic views showing details of the Frame Locker.
Figure 16:
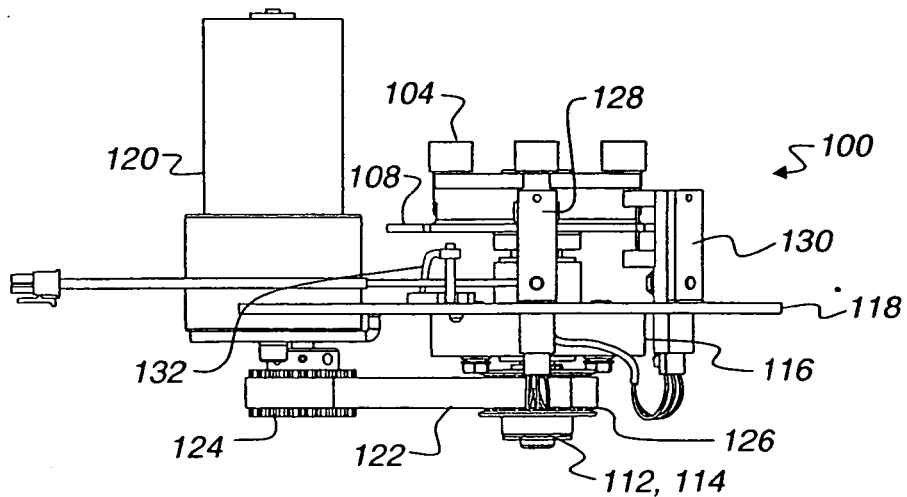
Figure 17:
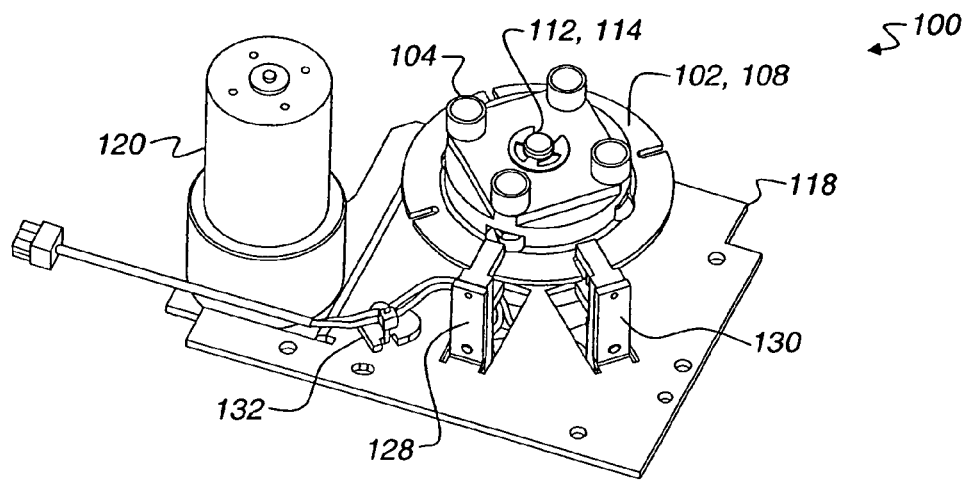
Figure 18:
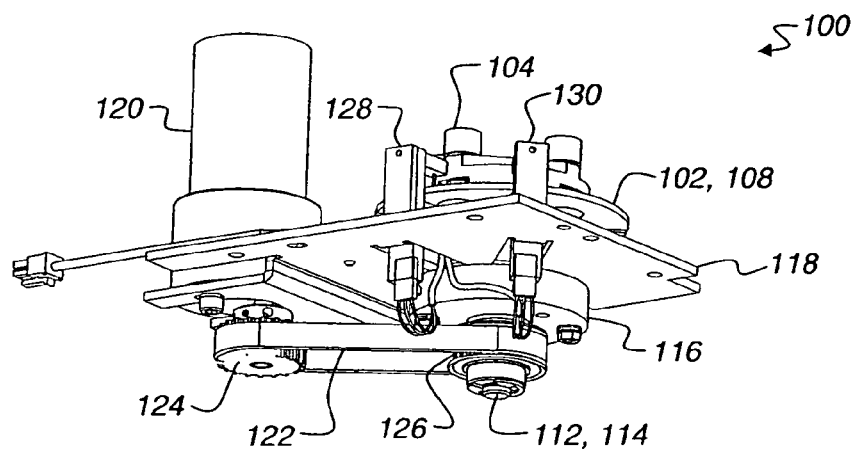

According to a feature of the present invention, a "Frame Locker" (FL) mechanism dynamically locks the scanning assembly 34 to the outer frame assembly 30 during cassette transfer. As shown in FIGS. 13 and 14, FL 100 includes a cam follower assembly 101 including rotating cam follower mount 102 and four cam followers 104 mounted on the scan assembly 34 and a locating cam plate 106 mounted on outer frame assembly 30. During the assembly of reader 10, the cassette elevator (not shown) is adjusted to the cassette handling assembly 14. While the adjusted position is temporarily frozen with assembly tooling, the outer frame assembly cam plate 106 is positioned over the scan assembly cam follower assembly 101. The outer frame assembly cam plate 106 is then rigidly fixed to outer frame assembly 30 and the assembly tooling is removed.

FIGS. 15–19 show FL 100 in further detail. FL 100 includes an encoder disc 108 which has four slots 110 used to identify state or position. Encoder disc 108 and cam follower mount 102 are supported on pivot shaft 112 having retaining ring 114. Shaft 112 is rotatably supported by bearing and shaft housing 116 mounted on FL mount frame 118. DC motor 120 is connected to shaft 112 via timing belt 122 and pulleys 124 and 126. Through beam optical sensors 128 and 130 control the FL cam follower positions. Wire tie and base 132 is also provided.

Figure 20:
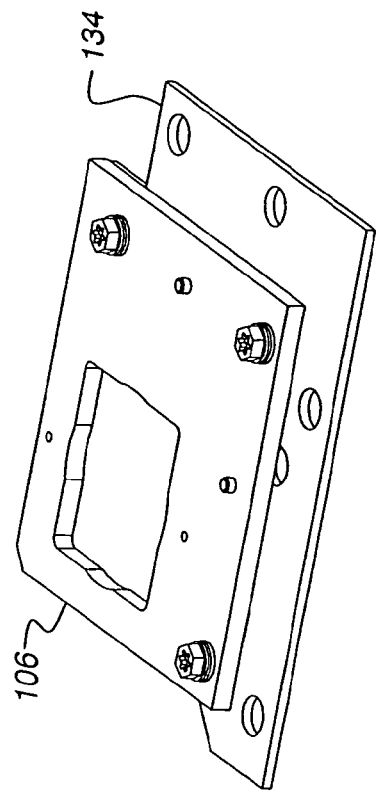
FIGS. 20–22 are diagrammatic views showing the cam plate in greater detail.
Figure 19:
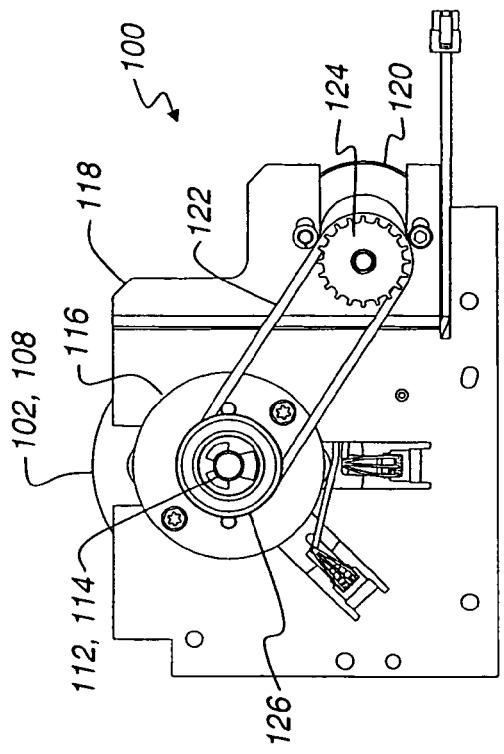
Figure 21:
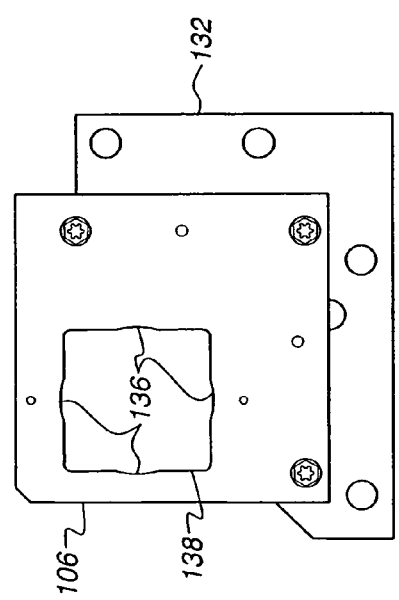
Figure 22:
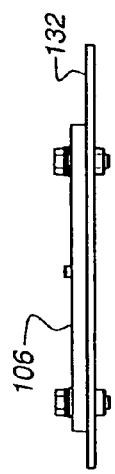

FIGS. 20–22 show the cam plate 106 in further detail. Cam plate 106 is mounted on frame mount plate 134. Cam plate 106 has four circular regions 136 used to lock the frame assemblies. Cam plate 106 has four square regions 138 for clearance when the FL 100 is disengaged.

Figure 23:
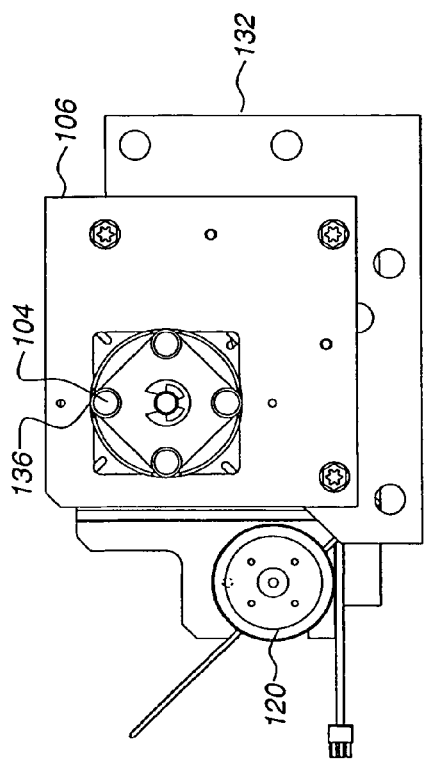
FIGS. 23–25 are diagrammatic views showing the Frame Locker in the engaged position.
Figure 24:
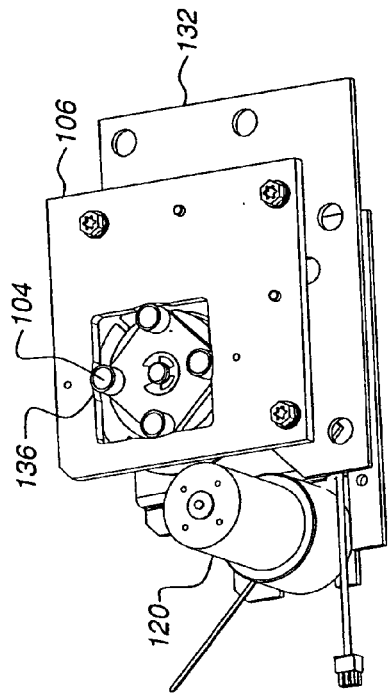
Figure 25:
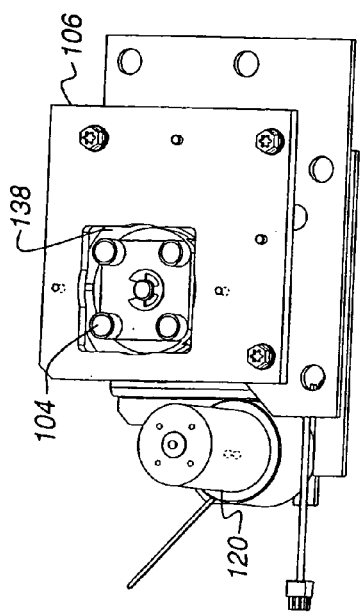

FIGS. 23–25 show FL 100 in the engaged position. Motor 120 has rotated cam follower mount 102 to a position at which cam followers 104 are aligned with the circular regions 136 of cam plate 106. An encoder slot 110 is located at the engagement position 140 at engage sensor 130.

Figure 27:
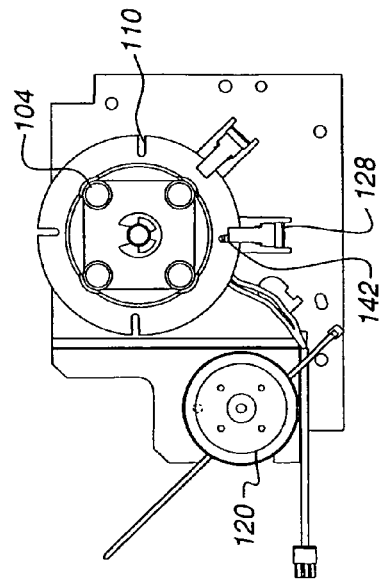
FIGS. 26–28 are diagrammatic views showing the Frame Locker in the disengaged position.
Figure 26:
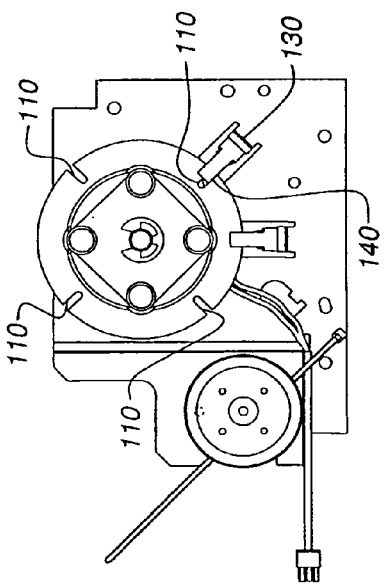
Figure 28:
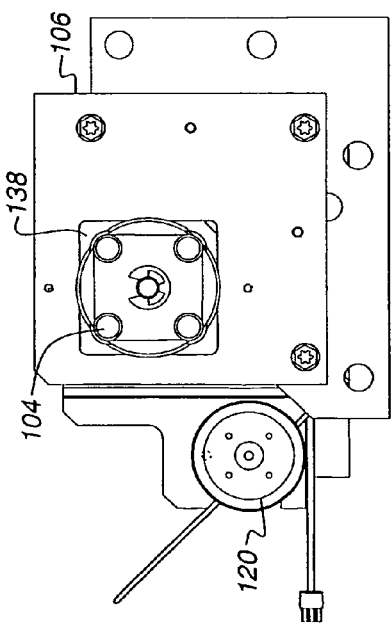

FIGS. 26–28 show FL 100 in the disengaged position. Motor 120 has rotated cam follower mount 102 by 45 degrees to a position at which cam followers 104 are in the square regions 138 of cam plate 106. Cam followers 104 have ample clearance within cam plate 106 so that the scanning assembly is vibrationally isolated from the outer frame assembly during the scanning process. An encoder slot 110 is located at the disengagement position 142 at disengage sensor 128.

The circular cam profile combined with corner lead-ins and the cam followers creates a highly efficient locating device. This is contrary to a typical locating device such as a pin in hole arrangement.

Figure 29:
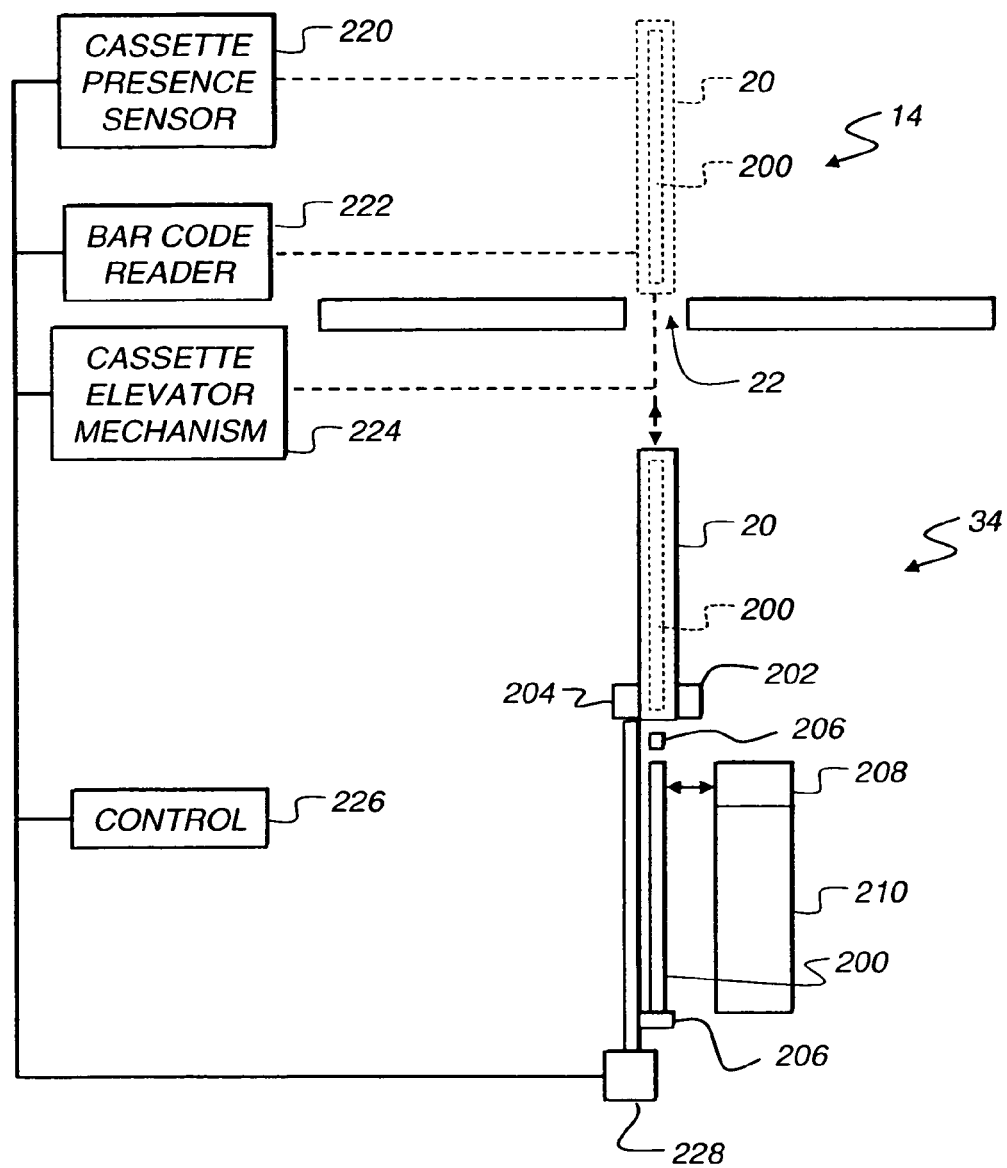
FIG. 29 is a diagrammatic view illustrating the cassette/storage phosphor movement through the storage phosphor reader.

FIG. 29 is a diagrammatic view useful in explaining the present invention. As shown, after cassettes have been loaded onto assembly 14 and the start button 24 actuated, sensors (not shown) detect the presence of cassettes. When cassette presence sensor 220 detects a cassette 20 in the position next to slot 22, a barcode label on the cassette is read by barcode reader 222 which allows the cassette elevator mechanism 224 to be put into the correct position for the particular size cassette to be read. In addition, FL 100 is engaged to align the scanning assembly 34 with the cassette handling assembly 14 on outer frame assembly 30. Cassette handling assembly 14 positions a cassette 20 containing an exposed storage phosphor 200 at slot 22 and cassette elevator mechanism 224 engages the cassette 20 and brings it down to storage phosphor extractor assembly 206. The FL 100 insures the proper alignment for the handoff to the elevator mechanism 224.

Cassette 20 is now registered against a datum structure and clamps 202, 204 hold the cassette in position. FL 100 is disengaged, allowing scanning assembly 34 to be isolated through isolators 38 and 40. Storage phosphor 200 is extracted from cassette 20 by extractor assembly 206 and transported vertically past laser scanner 208 and erase assembly 210 by drive mechanism 228 at a very constant velocity. After the image has been read and storage phosphor 200 erased, FL 100 is reengaged to bring the scanning assembly in alignment with cassette handling assembly 14. Drive mechanism 228 causes assembly 206 to reinsert storage phosphor 200 into cassette 20 and latch it. Elevator mechanism 224 delivers cassette 20 to cassette handling assembly 14 in preparation for processing the next cassette.

The invention has been described in detail with particular reference to certain preferred embodiments thereof, but it will be understood that variations and modifications can be effected within the spirit and scope of the invention.

PARTS LIST

10—storage phosphor reader
12—housing
14—cassette handling assembly
15—load side
16—cassette loading location
17—unload side
18—cassette unloading location
20—cassette
22—central slot
24—start button
30—outer frame assembly
31—wheels
32—inner frame assembly
34—scanning assembly
36—upper frame assembly
38—low frequency vibration isolators
40—higher frequency vibration isolators
60—computer
62—world wide power supply
64—UPS battery backup
66—electrical box
70—jack stud 100—FL
101—cam follower assembly
102—cam follower mount
104—cam follower
106—cam plate
108—encoder disc
110—slot
112—pivot shaft
114—retaining ring
116—bearing and shaft housing
118—FL mount frame
120—DC motor
122—timing belt
124, 126—pulley
128, 130—through beam optical sensor
132—wire tie and base
134—frame mount plate
136—circular regions
138—square regions
140—engagement position
142—disengagement position
200—storage phosphor
202, 204—clamps
206—extractor mechanism
208—laser scanner
210—erase assembly
220—cassette presence sensor
222—barcode reader
224—cassette elevator mechanism
228—drive mechanism

The invention claimed is:

1. A storage phosphor reader apparatus, comprising:
an outer frame assembly including a cassette handling assembly, located on the upper part of the outer frame assembly, for handling vertically oriented cassettes;
an inner frame assembly;
a first set of vibration isolators for mounting the inner frame assembly on the outer frame assembly, so as to minimize vibrations caused in the outer frame assembly from being transmitted to the inner frame assembly;
a storage phosphor scanning assembly;
a second set of vibration isolators for mounting the scanning assembly on the inner frame assembly, so as to minimize vibrations caused in the inner frame assembly frame from being transmitted to the scanning assembly; and
a frame locker assembly for locking the scanning assembly to the outer frame assembly when a cassette is transferred between the cassette handling assembly and the scanning assembly and for unlocking the scanning assembly during scanning of a storage phosphor removed from the cassette, so that the first and second sets of vibration isolators isolate the scanning assembly during storage phosphor scanning.

2. The apparatus of claim 1 wherein the frame locker assembly includes a cam mounted on the outer frame assembly and a cam follower assembly cooperating with the cam and mounted on the scanning assembly.

3. The apparatus of claim 2 wherein the cam has an inner surface generally square in shape having a plurality of circular regions and a plurality of square regions, wherein the cam assembly includes a rotatable cam follower mount and a plurality of cam followers mounted on the cam follower mount, such that when the frame locker assembly is locked, the cam follower mount is rotated to position the cam followers in the circular regions of the inner cam surface, and when the frame locker assembly is unlocked, the cam follower mount is rotated to position the cam followers in the square regions of the inner cam surface.

4. The apparatus of claim 3 wherein the cam inner surface has four square regions located at the corners of the square inner surface, wherein the cam inner surface has four circular regions located midway between the square regions, and wherein the cam follower assembly has four cam followers mounted on the cam follower mount at positions 90 degrees from each other.

5. The apparatus of claim 3 including an encoder disc having encoder features mounted for rotation with the cam follower mount and a sensor assembly for sensing the encoder marks to indicate when the apparatus is locked or unlocked.

6. The apparatus of claim 5 wherein the encoder marks are slots on the edge of the encoder disk and wherein the sensor assembly includes first and second sensors located at a 45 degree angle relative to each other, such that the first sensor indicates when the apparatus is unlocked and the second sensor indicates when the apparatus is locked.

7. The apparatus of claim 6 wherein the first and second sensors are through beam optical sensors.

8. In a storage phosphor reader apparatus having a storage phosphor cassette handling assembly mounted on an outer frame assembly and a storage phosphor scanning assembly mounted in vibration isolation on the outer frame assembly, a method comprising the steps of:
locking the scanning assembly to the outer frame assembly when a storage phosphor cassette is transferred between the cassette handling assembly and the storage phosphor scanning assembly; and
unlocking the scanning assembly from the outer frame assembly when a storage phosphor removed from a transferred cassette is scanned by the scanning assembly, so that the scanning assembly is vibrationally isolated from the outer frame assembly during such scanning.

* * * * *